United States Patent Office 2,913,618
Patented Nov. 17, 1959

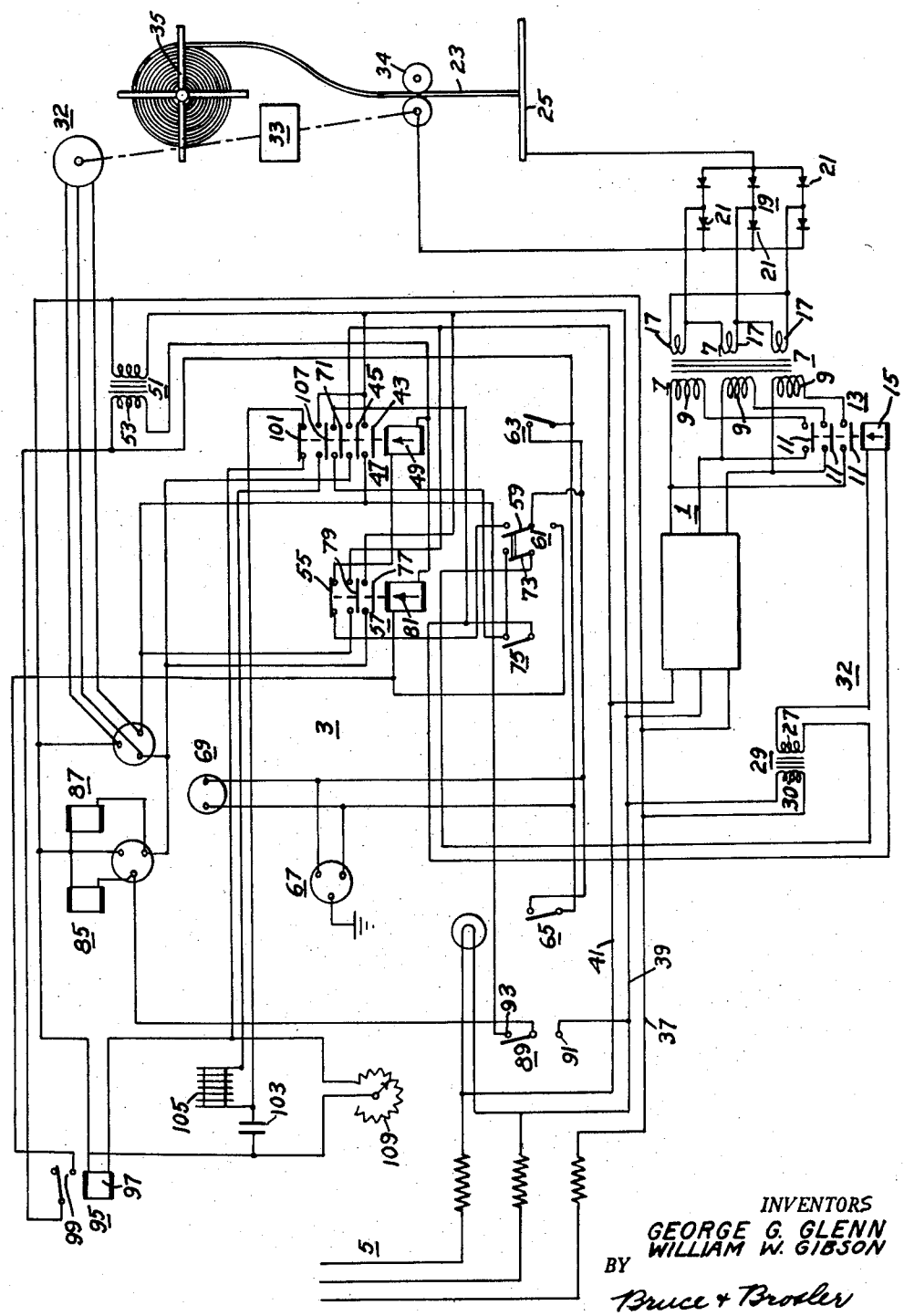

2,913,618

WELDING SYSTEM

George G. Glenn, Oakland, and William W. Gibson, Alameda, Calif., assignors to Glenn Pacific Power Supply Corp., a corporation of California Application February 11, 1957, Serial No. 639,458

11 Claims. (Cl. 314—74)

Our invention relates to a welding system and more particularly to wire feed control in electric welding.

In the art of electric welding, such as in Sigma welding, a continuously fed wire of electrical material is employed as the consumable electrode. Arc voltage may be obtained from a conventional type of power supply, but its use necessitates supplemental controls to compensate for its sharp drooping voltage characteristic.

The development of the constant voltage rectifier type power source, such for example, as constitutes the subject matter of the pending application of George G. Glenn et al. for Constant Voltage Power Supply System for Welding Equipment, Serial No. 357,022, filed May 25, 1953, now Patent No. 2,800,571 of July 23, 1957, has not only greatly simplified the power source for welding purposes, but the fact that such voltage supply provides a substantially constant voltage, the need for complex supplemental compensating controls is rendered unnecessary. As a result, such power supply, because of its relative simplicity, may be made rugged and durable.

Among the objects of the present invention are:

(1) To provide a novel and improved wire feed system of simple and rugged design which may be blended in with such simple and rugged constant voltage power supply source, and together provide welding apparatus characterized by its overall simplicity, ruggedness, stability, and efficiency;

(2) To provide a novel and improved overall welding system for Sigma welding or the like employing continuously fed electrode wire, which system shall be both simple and rugged, yet efficient in its operation and in the results performed;

(3) To provide a novel and improved overall welding system requiring a minimum of controls;

(4) To provide a novel and improved wire feed system for welding;

(5) To provide a novel and improved wire feed system for the feeding of electrode wire in welding;

(6) To provide a novel and improved wire feed system for welding, involving a motor driven reel and wherein braking of the drive motor may be accomplished in sufficiently brief space of time to prevent overfeeding of the electrode wire during stops; and (7) To provide a novel and improved wire feed system which is very flexible in its applications.

Additional objects of our invention will be brought out in the following description of a preferred embodiment of the same, taken in conjunction with the accompanying drawings wherein, The figure is a circuit diagram of our improved overall welding system.

Referring to the drawing for details of our invention in its preferred form, the overall system depicted involves a welding voltage power supply 1 and a wire feed system 3.

The welding voltage power supply is preferably of the three phase rectifier type such as illustrated and described in the Glenn et al. patent above noted, and represents a system essentially devoid of inductive reactance, thereby rendering it capable of providing direct current voltages of substantially constant value and within a range suitable for welding purposes. Such system is connectible to a three phase power line 5, and insofar as it is pertinent to the present invention, involves a plurality of output transformers 7, whose primary windings 9 are connectible preferably in delta formation, through the normal open contacts 11 of a solenoid operated relay 13 having an operating winding 15.

The secondary windings 17 of the output transformers are preferably also connected in delta formation, in conjunction with a rectifier circuit 19 involving rectifiers 21 of the semi-conductive types such as selenium rectifiers, and the direct current voltages obtained are applicable between the wire electrode 23 and the work 25 for the generation and maintenance of the arc.

The winding 15 of the relay 13 is energizable from the secondary winding 27 of a single phase step-down transformer 29, the primary 30 of which may be connected across a single phase of the three phase power line. This provides a single phase control circuit 31. With the relay contacts open, it is apparent that the voltage power supply will not be functioning, but that welding voltages will be made available promptly upon energization of the relay to close such contacts.

As will be seen, this single phase control circuit is tied in with the wire feed system to maintain synchronization of operation, when desired, between the voltage supply system and the wire feed system.

The wire feed system, in the main, controls the functioning of a drive motor 32 which is part of the wire feed assembly, wherein, through reduction gearing 33, it drives suitable feed rolls 34, which in turn withdraw the wire from a storage reel 35 and feed it to the work.

The drive motor is of the three phase type, supplied from the three phase power line 5, one line 37 of which goes directly to the motor without break. For forward rotation of the motor to feed electrode wire, the other two lines 39 and 41 are connected to the motor through normally open contacts 43 and 45 of a solenoid switch means 47. This switch means includes a solenoid winding 49 which is energizable from one phase of the power lines through a step-down transformer 51, the energizing circuit, starting at one end of the secondary winding 53 of said transformer, including the solenoid winding itself, the normally closed contacts 55 of a second solenoid switch means 57, one blade 59 of a double-pole double throw switch 61, in its "up" position, and back to the transformer secondary by way of any one of a plurality of parallel connected operating controls such as an inch-switch 63, single-blade single-throw switch 65, a trigger control receptacle 67, and a current relay receptacle 69. Upon utilization of any one of these parallel connected devices, in accordance with the desired manner of use of the equipment, the circuit to the motor 32 will be closed and the motor energized to drive the wire feed mechanism in accordance with the parallel connected device employed.

As previously indicated, the single phase control circuit 31 for the arc voltage supply system is coupled in with the wire feed system in order to assure synchronism between the establishment of an arc and the energization of the wire feed drive motor. This is accomplished in the present instance by running the single phase control circuit of the arc voltage system through a separate set of normally open contacts 71 embodied in the solenoid switch means 47 and the second blade 73 of the double-pole double-throw switch, also when in its "up" position.

When so connected, the arc voltage supply will go on and off with energization and de-energization of the wire feed motor. However, if power supply is desired to be maintained in spite of starting and stopping of the wire feed drive motor, a single-blade single-throw switch 75 or equivalent may be connected across the normally open contacts 71 and when closed, will by-pass the contacts 71.

To reverse the direction of rotation of the motor necessitates the interchange of two of the three phase connections thereto. This is provided for by running branches of the two lines 39 and 41 through normally open contacts 77 and 79 of the second solenoid switch means 57 and reversing the connections thereof at the motor.

The solenoid winding 81 of this switch means is energized from the secondary 53 of the step-down transformer 51 through the blade 59 of the double-pole double-throw switch when in its reverse or "down" position, and any of the aforementioned parallel connected devices. Therefore, upon opening the switch 61 from its "up" position, the first solenoid switch means 47 will be deenergized, thus removing power from the motor 33 for forward direction of operation, and simultaneously therewith, removing voltage from the electrode, thus extinguishing the arc. Upon the switch closing in its "down" position, the second solenoid switch means 57 will be energized to apply power for reverse rotation of the motor, but the arc will not be re-established under these conditions as the arc is not desired when the motor is running in the reverse direction.

For inert gas welding processes, provision is made for turning on a supply of water and a supply of gas which may have previously been connected to the apparatus. For this purpose we provide a solenoid-controlled normally closed valve 85 and 87 respectively.

The solenoid of the inert gas line is connectible across one phase winding of the motor 33, whereby it becomes energizable through contacts 45 of the solenoid switch means 47. Thus it can function only during energization of the motor.

The water control valve is likewise connectible to one phase of the three phase power line, a choice being permitted, however, between a direct connection to the power source, or through the first solenoid switch means 47 by connecting one lead of the solenoid to the middle connection of a single-pole double-throw switch 89, one contact 91 of the switch being connected directly to a line 39 of the three phase power supply, while the other contact 93 is connected to this same line through contacts 43 of the first solenoid switch means 47. This offers the operator a source of continuous water flow or flow which is turned on and off automatically with the gas flow and motor operation.

A problem confronted in the feeding of the wire electrode in equipment of the above character, is to avoid overrunning of the electrode wire upon extinguishing of the arc. This is due largely to the momentum developed in the drive motor and other moving components which are functioning to feed the wire to the work.

A feature of the present invention resides in the provision of means for promptly halting the feed of wire when desired, and this is accomplished by electrically braking the motor in a novel manner, which is not only simple, but extremely effective.

Toward this end we provide a relay 95 including a winding 97 and a pair of normally open contacts 99. Connected across this winding by way of normally closed contacts 101 associated with the solenoid switch means 47 is a fixed condenser 103. This condenser in turn is connectible in a charging circuit across one phase of the three phase lines, such circuit including a rectifier 105 preferably of the dry type, normally open contacts 107 in the solenoid switch means 47, where, upon energization of such solenoid switch means, the condenser will be connected in the rectifier circuit and receive a charge.

Upon de-energization of the solenoid switch means 47, the relay winding 97 will then be shunted across the now charged condenser to provide a relatively low resistance discharge path sufficient to produce temporary energization of the relay 95 with a resulting momentary closing of its contacts 99.

These contacts are included in a reversing circuit to the motor, which may be traced from one side of the secondary winding 53 of the step-down transformer 51, through the relay contacts 99, then through the solenoid winding 81 of the solenoid switch means 57 to the other side of the secondary of the step-down transformer. Upon energization of this solenoid switch means, a reversal of phase takes place in the power to the motor. Such reversal of phase, tending to cause reverse rotation of the motor, must necessarily oppose prevailing rotation, and thus act to brake the motor. Consequently, an exceedingly fast deceleration of the motor will take place, and reversal of rotation can be avoided by emptying the condenser of its stored energy by the time the speed of the motor has been reduced to approximately zero revolutions per minute. This point can be controlled with a degree of precision by the utilization of an adjustable resistor or potentiometer 109 across the condenser, which offers the operator means for controlling the discharge period of the condenser.

The inherent stability of the system described, enabling complete elimination of sensitive controls such as are required in conventional systems, and the exceedingly fast stopping of the wire feed motor provided for by the braking system included in the system, permit of a wide range of wire feed speeds, which can be obtained by resort to use of known speed change mechanisms and/or change of gear ratios. A speed range of the order of 24 inches per minute to 1500 inches per minute may thus readily be obtained in equipment embodying the system of the present invention.

While we have illustrated and described our invention in its preferred form, the same is subject to alteration and modification without departing from the underlying principles involved. We, accordingly, do not desire to be limited in our protection to the specific details disclosed herein, except as may be necessitated by the appended claims.

We claim:

1. A welding system comprising means for feeding welding wire to work on which a welding operation is to be performed, said means including a drive motor; a line connection to said drive motor; a substantially constant voltage power supply means having output voltages within a range of direct current welding voltages, and including a normally open relay, said normally open relay having an electrically energizable winding for controlling operation of said relay; means for connecting said constant voltage power supply means between such welding wire and such work to establish an arc between such welding wire and such work when said power supply means is energized and such welding wire is moved into contact with such work; and means for substantially simultaneously energizing said motor and said relay winding to effect and maintain such arc.

2. A welding system comprising means for feeding welding wire to work on which a welding operation is to be performed, said means including a drive motor; a line connection to said drive motor; a substantially constant voltage power supply means having output voltages within a range of direct current welding voltages, and including a normally open relay, said normally open relay having an electrically energizable winding for controlling operation of said relay; means for connecting said constant voltage power supply means between such welding wire and such work to establish an arc between such welding wire and such work when said power supply means is energized and such welding wire is moved into contact with such work; and means for substantially simultaneously energizing said motor and said relay winding to effect and maintain such arc, said means including a multi-contact electrically operated switch means having a control winding, normally open contacts in the line connection to said motor, and normally open contacts in circuit with said relay winding; means for energizing said control winding from said line connection; and means for preventing overrunning of said wire feed drive motor when stopping the same, said means including electrically energizable reversing switch means connectible to said line connection through the contacts of a normally open contact relay having a relay winding, means for momentarily energizing said normally open contact relay winding to place reversing power on said motor upon initial disconnection of said motor, said means including an electrical condenser in series with a rectifier across a source of alternating current during welding operations and means for switching said condenser across said normally open contact relay winding upon such initial disconnection of said motor from its power supply.

3. A welding system comprising means for feeding welding wire to work on which a welding operation is to be performed, said means including an alternating current drive motor; an alternating current line connection to said drive motor; power supply means for converting line voltage to a range of direct current welding voltage, said means including an output transformer having a primary winding and a secondary winding, rectifying means including said secondary winding, and a normally open relay, said normally open relay having an electrically energizable winding for controlling operation of said relay; means for connecting said constant voltage power supply means between such welding wire and such work to establish an arc between such welding wire and such work when said power supply means is energized and such welding wire is moved into contact with such work; means for substantially simultaneously energizing said motor and said normally open relay winding to effect and maintain such arc, said means including a multi-contact electrically operated switch means having a control winding, normally open contacts in said alternating current line connection to said motor, and normally open contacts in circuit with said relay winding; means for manually energizing said switch means control winding from an alternating current power source; and means for preventing overrunning of said wire feed drive motor when stopping the same, said means including electrically energizable reversing switch means connectible to such power source, through the contacts of a normally open contact relay having a relay winding, means for momentarily energizing said normally open contact relay winding to place reversing power on said motor upon initial disconnection of said motor, said means including an electrical condenser in series with a rectifier across a source of alternating current during welding operations and means for switching said condenser across said normally open contact relay winding upon such initial disconnection of said motor from its power supply, and means for adjusting the discharge period of said condenser.

4. A welding system comprising means for feeding welding wire to work on which a welding operation is to be performed, said means including an alternating current drive motor; an alternating current line connection to said drive motor; power supply means for converting line voltage to a range of direct current welding voltages, said means including an output transformer having a primary winding and a secondary winding, rectifying means including said secondary winding, and a normally open relay, said normally open relay having an electrically energizable winding for controlling operation of said relay; means for connecting said constant voltage power supply means between such welding wire and such work to establish an arc between such welding wire and such work when said power supply means is energized and such welding wire is moved into contact with such work; means for substantially simultaneously energizing said motor and said normally open relay winding to effect and maintain such arc, said means including a multi-contact electrically operated switch means having a control winding, normally open contacts in said alternating current line connection to said motor and normally open contacts in circuit with said relay winding; means for manually energizing said switch means control winding from an alternating current power source, said means including a step-down transformer having a primary winding connectible to said source, and a secondary winding connectible to said switch means control winding through one of a plurality of manually operable parallel connected circuit closing means; and means for preventing overrunning of said wire feed drive motor when stopping the same, said means including electrically energizable reversing switch means connectible to such power source, through the contacts of a normally open contact relay having a relay winding, means for momentarily energizing said normally open contact relay winding to place reversing power on said motor upon initial disconnection of said motor, said means including an electrical condenser in series with a rectifier across a source of alternating current during welding operations, and means for switching said condenser across said normally open contact relay winding upon such initial disconnection of said motor from its power supply, and means for adjusting the discharge period of said condenser, said means including a variable resistor connected across said condenser.

5. A welding system comprising means for feeding welding wire to work on which a welding operation is to be performed, said means including a three phase drive motor; a three wire line connection to said drive motor; power supply means for converting three phase power line voltage to a range of direct current welding voltages, said means including a plurality of output transformers, each having a primary winding and a secondary winding, rectifying means including said secondary windings, and a normally open relay, said normally open relay having an electrically energizable winding for controlling operation of said relay; means for connecting said constant voltage power supply means between such welding wire and such work to establish an arc between such welding wire and such work when said power supply means is energized and such welding wire is moved into contact with such work; means for substantially simultaneously energizing said motor and said normally open relay winding to effect and maintain such arc, said means including a multi-contact electrically operated switch means having normally open contacts in at least one of the wires of the three wire line to said motor and normally open contacts in circuit with said relay winding, and a control winding; means for manually energizing said switch means control winding from one phase of a three phase power source, said means including a step-down transformer having a primary winding connected across one such phase, and a secondary winding connectible to said switch means control winding through one of a plurality of manually operable parallel connected circuit closing means; and means for preventing overrunning of said wire feed drive motor when stopping the same, said means including electrically energizable reversing switch means connectible to one phase of a three phase power source, through the contacts of a normally open contact relay having a relay winding, means for momentarily energizing said normally open contact relay winding to place reversing power on said motor upon initial disconnection of said motor, said means including an electrical condenser in series with a rectifier across a source of alternating current during welding operations, and means for switching said condenser across said normally open contact relay winding upon such initial disconnection of said motor from its power supply, and means for adjusting the discharge period of said condenser, said means including a variable resistor connected across said condenser.

6. A wire feed system for welding equipment comprising an alternating current drive motor; lead means for connecting said motor to a source of alternating current power to cause rotation of said motor in the wire feed direction; and means for momentarily reversing the lead means to said motor while running, to effect a prompt braking thereof, said means including a normally open contact relay having a relay winding, electrically energizable reversing switch means connectible to said source of power through the contacts of said relay, and means for momentarily energizing said relay winding to close its associated contacts to thereby energize said reversing switch means and cause reversal of the lead means to said motor.

7. A wire feed system for welding equipment comprising an alternating current drive motor; lead means for connecting said motor to a source of alternating current power to cause rotation of said motor in the wire feed direction; and means for momentarily reversing the lead means to said motor while running, to effect a prompt braking thereof, said means including a normally open contact relay having a relay winding, electrically energizable reversing switch means connectible to said source of power through the contacts of said relay, and means for momentarily energizing said relay winding to close its disassociated contacts to thereby energize said reversing switch means and cause reversal of the lead means to said motor; and means for adjusting the energizing period for said relay winding.

8. A wire feed system for welding equipment comprising an alternating current drive motor; lead means for connecting said motor to a source of alternating current power to cause rotation of said motor in the wire feed direction; means for momentarily reversing the lead means to said motor while running, to effect a prompt braking thereof, said means including a normally open contact relay having a relay winding, electrically energizable reversing switch means connectible to said source of power through the contacts of said relay, means for momentarily energizing said relay winding to close its associated contacts to thereby energize said reversing switch means and cause reversal of the lead means to said motor, said means including an electrical condenser in series with a rectifier across a source of alternating current power during welding operations to charge said condenser during such welding operations, and means for switching said condenser across said relay winding upon disconnection of said motor from its wire feed connection to said power source, whereby the resulting reversal of said lead means to said motor will continue only so long as said condenser energizes said relay.

9. A wire feed system for welding equipment comprising a drive motor; lead means for connecting said motor to a source of power to cause rotation of said motor in the wire feed direction; means for momentarily reversing the lead means to said motor while running, to effect a prompt braking thereof, said means including a normally open contact relay having a relay winding, electrically energizable reversing switch means connectible to said source of power through the contacts of said relay, means for momentarily energizing said relay winding to close its contacts to thereby energize said reversing switch means and cause reversal of the lead means to said motor, said means including an electrical condenser across a source of power during welding operations to charge said condenser during such welding operations, and means for switching said condenser across said relay winding upon disconnection of said motor from its wire feed connection to said power source, whereby the resulting reversal of said lead means to said motor will continue only so long as said condenser energizes said relay; and means for adjusting the discharge period of said condenser.

10. A wire feed system for welding equipment comprising an alternating current drive motor; lead means for connecting said motor to a source of alternating current power to cause rotation of said motor in the wire feed direction; means for momentarily reversing the lead means to said motor while running, to effect a prompt braking thereof, said means including a normally open contact relay having a relay winding, electrically energizable reversing switch means connectible to said source of power through the contacts of said relay, means for momentarily energizing said relay wniding to close its associated contacts to thereby energize said reversing switch means and cause reversal of the lead means to said motor, said means including an electrical condenser in series with a rectifier across a source of alternating current power during welding operations to charge said condenser during such welding operations, and means for switching said condenser across said relay winding upon disconnection of said motor from its wire feed connection to said power source, whereby the resulting reversal of said lead means to said motor will continue only so long as said condenser energizes said relay; and means for adjusting the discharge period of said condenser.

11. A welding system comprising means for feeding welding wire toward work on which a welding operation is to be performed, said means including a drive motor; means for producing a substantially constant voltage power supply having output voltages within a range of direct current welding voltage; means for connecting said constant voltage power supply between such welding wire and such work to establish an arc between such welding wire and such work when said power supply means is energized and such welding wire is moved into contact with such work; and means for substantially simultaneously energizing said motor and said constant voltage power supply to create and maintain a welding arc between such wire and such work.

References Cited in the file of this patent

UNITED STATES PATENTS

| | | |
|---|---|---|
| 1,449,579 | Boddie | Mar. 27, 1923 |
| 2,837,708 | Jones et al. | June 3, 1958 |